United States Patent
Tzuk et al.

(10) Patent No.: US 7,359,413 B2
(45) Date of Patent: Apr. 15, 2008

(54) DIAMOND-COOLED SOLID-STATE LASER

(75) Inventors: Yitshak Tzuk, Rehovot (IL); Alon Tal, Hod HaSharon (IL); Yaakov Glick, Rehovot (IL); Yuval Isbi, Even Yehuda (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 260 days.

(21) Appl. No.: 10/509,161

(22) PCT Filed: Apr. 1, 2003

(86) PCT No.: PCT/IL03/00272

§ 371 (c)(1),
(2), (4) Date: Sep. 28, 2004

(87) PCT Pub. No.: WO03/085789

PCT Pub. Date: Oct. 16, 2003

(65) Prior Publication Data

US 2005/0180472 A1 Aug. 18, 2005

(30) Foreign Application Priority Data

Apr. 7, 2002 (IL) ................................. 149014

(51) Int. Cl.
*H01S 3/04* (2006.01)

(52) U.S. Cl. .......................................... 372/34; 372/70
(58) Field of Classification Search ................. 372/34, 372/70, 55; 257/77; 423/408, 46; 359/341.1
See application file for complete search history.

(56) References Cited

U.S. PATENT DOCUMENTS

| | | | | |
|---|---|---|---|---|
| 5,309,457 | A * | 5/1994 | Minch | 372/34 |
| 6,101,201 | A * | 8/2000 | Hargis et al. | 372/36 |
| 6,130,902 | A * | 10/2000 | Shimoji | 372/34 |
| 6,160,824 | A * | 12/2000 | Meissner et al. | 372/7 |
| 6,385,220 | B1 * | 5/2002 | Miller et al. | 372/34 |
| 6,683,901 | B2 * | 1/2004 | Caprara et al. | 372/92 |
| 2003/0039284 | A1 * | 2/2003 | Zheng | 372/45 |

* cited by examiner

*Primary Examiner*—Minsun Oh Harvey
*Assistant Examiner*—Tuan N. Nguyen
(74) *Attorney, Agent, or Firm*—Dekel Patent Ltd.; David Klein

(57) ABSTRACT

A diode-pumped solid state laser, e.g., in a side-pumped or end-pumped configuration, including a lasing medium (30, 40, 62) comprising at least one surface (41) through which the laser is pumped, and at least one diamond plate (32, 42, 64) in thermal contact with the at least one surface (41). In an embodiment a plurality of segments of said lasing medium (62) are disposed in proximity to each other, and said at least one diamond plate (64) is disposed between two adjacent segments, and in thermal contact with said elements.

16 Claims, 5 Drawing Sheets

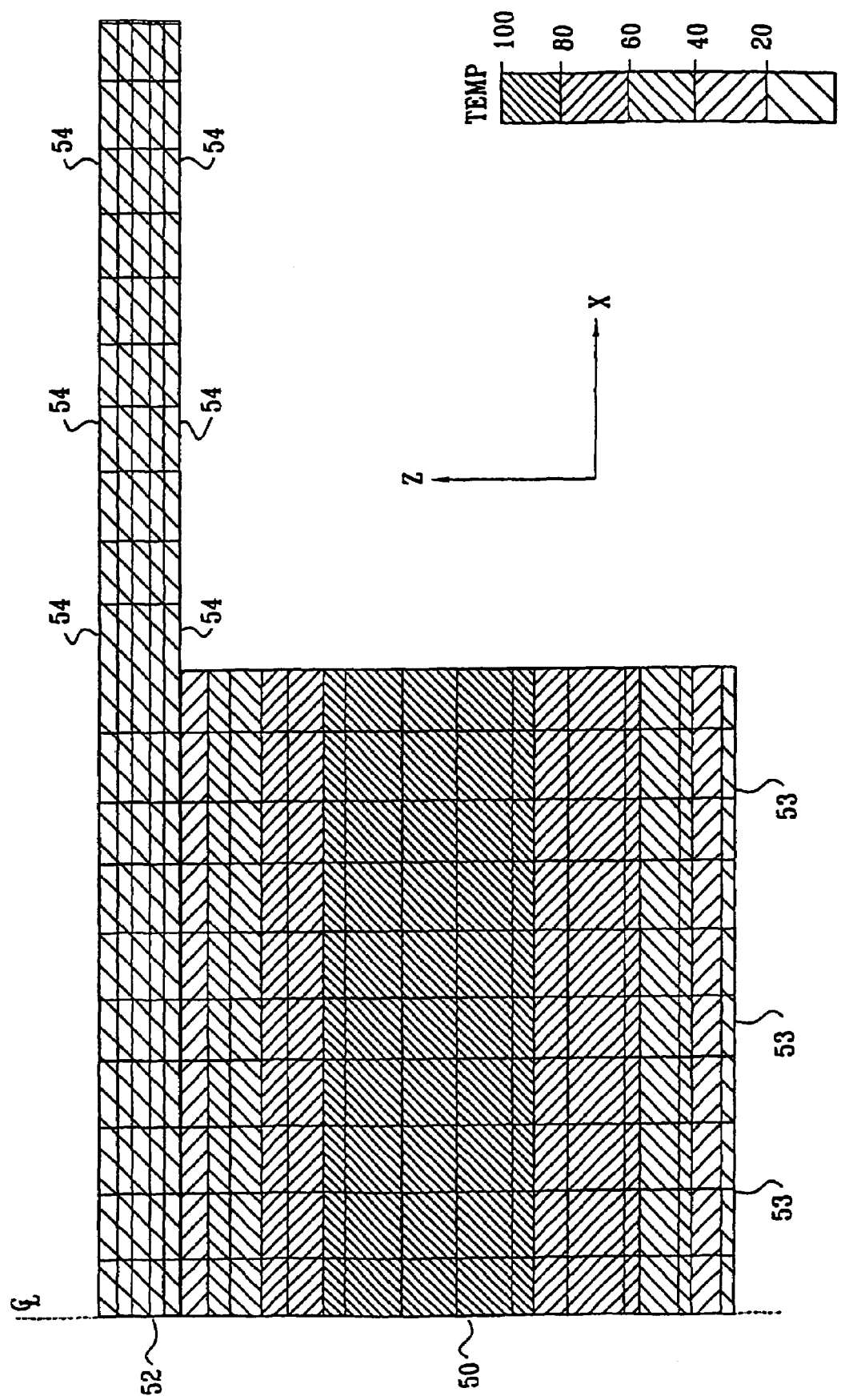

DIAMOND-COOLED SOLID-STATE LASER

FIELD OF THE INVENTION

The present invention relates to the field of methods for cooling solid state lasers, especially diode-pumped lasers in side- or end-pumped configuration.

BACKGROUND OF THE INVENTION

One of the primary problems limiting the performance of diode-pumped solid state lasers is the ability to remove heat generated within the lasing medium from the pump energy absorbed. Since only a small part of the pump energy is converted into laser energy, usually significantly less than 20%, the majority is absorbed and converted into heat, and has to be removed from the lasing medium. If the heat is not removed efficiently, the temperature of the lasing medium rises, thereby degrading the efficiency of the lasing action. Furthermore, if the temperature is not uniformly distributed within the medium, which can result, inter alia, from poor cooling design, aberrational thermal lensing can result, causing degradation and undetermined change of the beam mode. In addition, the lasing medium can undergo severe mechanical stress, causing distortion of the laser beam and even a danger of rod fracture. Efficient cooling of the lasing medium, on the other hand, enables higher lasing power to be extracted, and with a higher quality beam.

For these reasons, a great deal of effort has been expended on the development of efficient methods of cooling the lasing medium in solid state lasers, and especially, because of their more concentrated pump input levels, in diode pumped solid state lasers. Commonly used prior art cooling methods for end-pumped lasers include:

(a) The use of flowing water in direct contact with the outer envelope of the laser rod. Throughout this application, and as claimed, the term "rod" in connection with the lasing medium is understood to include "slab", or any other suitable lasing medium geometry.

(b) The application of water-cooled blocks of a high conductivity metal, such as copper, in intimate thermal contact with the lasing rod or slab, usually with a very thin intermediate layer of indium, typically 100 μm thick, to improve thermal contact.

(c) The application to the pumped face of a thin sapphire plate, whose periphery is cooled, to conduct the heat away from the face.

It is well known that cooling of a lasing slab in the same direction as the direction of pumping is generally desirable, since the temperature gradient generated by the heat dissipation is then in the same direction as the axis of cooling. As a result, for a side-pumped slab, geometrical symmetry of the temperature equipotentials is maintained with respect to the cooling/pumping direction. The lasing axis is perpendicular to this direction, along the length of the slab, and the repeated traverses of the intra-cavity beam following a zigzag geometrical path, ensure that the beam wavefront passes equally through all parts of the slab, such that on average, the beam undergoes no lensing in the zigzag direction. In the direction of the slab cross-section perpendicular to the zigzag direction, there is no such averaging, but since the temperature equipotentials are constant in this direction, there is no directional effect on the beam as it passes through each "temperature layer", and thermal lensing is thus minimized.

There are disadvantages to each of the above methods, as follows:

(a) The use of direct water-cooling of the laser rod, though very efficient, significantly increases the complexity of the head design. Firstly, there is a need to provide water seals at the relevant locations, with all the concomitant mechanical complexity. Secondly, there is need to prevent corrosion because of the water. The head design complexity is further compounded when the head is such that it is pumped through the face to be cooled, which, as explained above, is the preferred configuration. Finally, if the water flow is in direct contact with the laser rod, turbulence created by the water flow can cause the rod to vibrate, thereby causing sympathetic beam vibration or wander.

(b) The use of a water-cooled copper heat sink (or any other conductive metal) is thermally efficient, because of the high conductivity of the copper. The major disadvantage of this method, though, is that the opacity of the copper does not enable pumping of the laser in the same direction as the cooling direction, as preferred. Another disadvantage is the need to coat the copper block with an inert material such as gold, to avoid contamination or corrosion resulting from the comparatively "dirty" chemical nature of the copper.

(c) There is a disadvantage in the use of a peripherally-cooled sapphire cooling plate in that sapphire has a limited thermal conductivity, and this limits the pump load that can be born by the laser rod. For this reason, a peripherally-cooled sapphire cooling plate needs to be cooled as close as possible to the point of contact with the lasing medium. For example, in the above-mentioned Weber article, the sapphire plate is used to cool only the end face of the laser rod, the end face being of small dimensions, such that the heat flow path through the sapphire plate is of minimal length. The length of the rod then also needs its own water cooling arrangement.

Sapphire plates have also been described in the prior art in use in cooling side pumped lasers. In U.S. Pat. No. 5,974,061, to R. W. Byren et al., an edge pumped laser is described, in which sapphire plates are used as cladding to the wide side of the laser slab, while the slab is side pumped through its narrow edge. The sapphire cladding area is cooled by direct contact with water cooled copper or aluminum blocks, such that the heat flow is across the thickness of the sapphire regions, and similar to the disadvantages mentioned in paragraph (b) above, the pumping cannot be performed through the sapphire-cooled regions.

In U.S. Pat. No. 5,790,575 to J. M. Zamel et al., another side-pumped laser using sapphire plates is described, with pumping directed through the sapphire plates. However, in this laser, the sapphire plates act as transparent side walls for a water channel disposed between the lasing slab and the sapphire plates, and the lasing slab is effectively cooled by direct contact with flowing water. This design therefore possesses all the disadvantages mentioned in paragraph (a) above, of mechanical complexity and of the effects of water turbulence.

In U.S. Pat. No. 5,317,585, to E. Gregor, there is described a side pumped solid state laser, incorporating a thin sapphire heat conducting plate, which conducts heat away from the region of the lasing slab to heat sinks located at the peripheries of the plates. The laser is pumped along the same axis as that of the heat transfer from the slab. The heat conduction path in the sapphire plate is short, but because of the limited thermal conductivity of the sapphire, it would appear unlikely that the laser can be used at the maximum powers which its lasing slab would be capable of achieving if it were cooled more efficiently. This assumption is supported by some other described features of the laser, from which it is apparent that optimum heat conduction was not used. Thus for instance, the thermal contact of the sapphire plate(s) with the lasing slab is not optimized, being executed through "layers of transparent elastic material", which inevitably have a compromised value of thermal conductivity in comparison with solid, heat conductive, materials. In another embodiment, with a cylindrical rod geometry, thermal contact between the lasing rod and the sapphire is achieved by means of a cooling channel which contains slow flowing or even static water.

It is therefore expected that the use of sapphire heat conduction plates will result in significant lateral temperature gradients along the length of the sapphire plates, and hence, poor overall cooling, and poor uniformity of cooling of the lasing slab.

There therefore exists a serious need for a method of cooling side-pumped and end-pumped diode-pumped solid state lasers, which overcomes the various disadvantages and drawbacks of the prior art cooling methods.

SUMMARY OF THE INVENTION

The present invention seeks to provide a new diode-pumped solid state laser, which provides for improved cooling efficiency and cooling symmetry of the lasing rod compared to prior art lasers. The enhanced cooling improves the thermal distribution inside the lasing rod, enabling the construction of high power solid state lasers with improved efficiency and improved beam quality compared with prior art lasers. In addition, the new diode-pumped solid state laser is of simpler construction than prior art lasers of similar rating, and has potential portability. The cooling method according to the present invention, though primarily beneficial to side-pumped lasers, is applicable also to end-pumped lasers.

Thin diamond plates have been used for over 30 years as substrates in the semiconductor industry for providing good conductivity for dissipating the high heat levels generated in semiconductor devices. Their high thermal conductivity has made them a most preferred material for this use. They have also been used, in the same context, for heat sinking diode laser chips. The diamond plates used as semiconductor substrates are generally of the non-transparent type, because their cost is lower than that of transparent diamonds. In U.S. Pat. No. 5,020,880, to J. Bluege, there is described the use of optically transparent diamond plates in the output window of a high energy carbon dioxide laser. However, to the best of the applicants' knowledge, as opposed to their widespread use to cool semiconductor devices, diamond plates have never been used to cool optically-pumped solid state lasers.

There is thus provided, in accordance with a preferred embodiment of the present invention, a solid state diode-pumped laser, preferably using a slab for the lasing material, and wherein the cooling is performed by means of one or more thin plates of diamond intimately attached to one or more of the sides of the slab, through which side or sides the laser is pumped. Diamond is very transparent throughout the spectral range used for pumping, such that pumping can be performed through it virtually without any loss of pump power. Furthermore, the plates can be polished optically flat, such that they can be applied to the faces of the lasing slab by means of "wringing contact" with light pressure to hold them in place. Good thermal contact can be assured by using a small drop of fluid in the interface, which, with minimal pressure, will spread out to leave an exceedingly thin layer in the interface, which will practically not affect the heat flow across it. It is believed that the fluid thickness is of the order of a micron in thickness. It is understood that throughout this application and as claimed, the term "plate" is meant to refer to a piece of material having one dimension significantly thinner than its other two dimensions.

According to other preferred embodiments of the present invention, a diamond plate can also be used on the end of the lasing rod of an end-pumped laser, where the pump energy is input. Its application in this position in an end-pumped laser is particularly advantageous, since the pumping power density in the lasing medium is highest at the input end face, and it is at this point that the most effective cooling is thus required. The high transparency ensures that no additional heat load is added to the lasing rod assembly.

In addition to its high transparency at typical used pumping wavelengths, such as in the region of 808 nm, the diamond is also very transparent at 1.06 μm, the lasing wavelength of Nd:YAG lasers. A cooling window constructed of a thin diamond plate can thus also be preferably applied to the output end of the lasing rod or slab, in addition to any other cooling plates used elsewhere on the lasing material.

The thermal conductivity of the diamond is so high, being about five times better than the conductivity of copper, that it is possible to provide sufficient heat sinking to cool the plate or plates at a location remote from the region of heat input, which is the area of contact with the side of the slab. Because of this exceptionally high thermal conductivity, the diamond plates effectively transfer the cooling effect of the peripherally applied water to the central areas of the plate, with a minimal thermal resistance, but without the disadvantages mentioned above, arising from the direct presence of water cooling in those central areas.

Furthermore, because the heat transfer is so efficient, very thin diamond plates can be used, thus keeping the cost of the plates to a minimum. Furthermore, it becomes possible, according to a further preferred embodiment of the present invention, to cool the periphery of the diamond plate or plates by means of forced air, which is usually less efficient than water cooling, and therefore not generally used for the direct cooling of high power solid state laser heads. This enables the solid state laser according to the present invention to be operated without the need for attachment to water lines. This embodiment thus opens new possibilities for the convenient use of high power solid state lasers in portable applications, such as in mobile applications.

Furthermore, the simplicity of the structure of a laser head constructed using diamond plates enables, according to another preferred embodiment of the present invention, the construction of a multiple segment lasing head, wherein the lasing segments are stacked end to end, with a thin diamond plate between neighboring segments. The diamond plates provide an efficient cooling path from each of the segments, and the head can be side or end pumped through the total thickness of the complete segment/plate/segment/plate . . . stack. By this means, a compact multiple-segment laser rod can be produced with higher combined output power than would be attainable by the use of a single laser rod of similar dimensions.

The use of diamond plates thus combine the desired qualities of good thermal conductivity, significantly better than that provided by the prior art copper cooling slabs, coupled with the optical transparency of the prior art sapphire plates.

There is thus provided in accordance with an embodiment of the present invention, a diode-pumped solid state laser, e.g., in a side-pumped or end-pumped configuration, including a lasing medium comprising at least one surface through which the laser is pumped, and at least one diamond plate in thermal contact with the at least one surface.

The diamond plate or plates may preferably be cooled remotely from an area of thermal contact with the at least one surface. There may also be at least a second diamond plate in thermal contact with a second surface of the lasing medium. Either of the diamond plates may be cooled by means of convection or conduction (e.g., a cooling fluid, or a cooled metallic body, or by means of forced air). In the end-pumped embodiment, the lasing beam may be output through the second diamond plate.

In accordance with an embodiment of the present invention, the location of the diamond plate is such that the direction in which the laser is pumped and the direction in which the laser is cooled are essentially co-linear.

Further in accordance with an embodiment of the present invention, a plurality of segments of the lasing medium are disposed in proximity to each other, and the at least one diamond plate is disposed between two adjacent segments, and in thermal contact with the segments.

Still further in accordance with an embodiment of the present invention, the laser is side-pumped through at least one of the segments and essentially parallel to the plane of the at least one diamond plate.

Further in accordance with an embodiment of the present invention, the laser is end-pumped through the plurality of segments and through the at least one diamond plate. The thicknesses of the segments through which the end pumping is performed increase essentially according to the depth through which the pumping passes. Examples of a suitable lasing medium are Nd:YAG and Nd:YVO$_4$.

In accordance with an embodiment of the present invention, the at least one diamond plate is anti-reflecting at the wavelength at which the laser is pumped.

BRIEF DESCRIPTION OF THE DRAWINGS

The present invention will be understood and appreciated more fully from the following detailed description, taken in conjunction with the drawings in which:

FIGS. 3A and 3B are graphs showing the temperature equipotentials formed in a laser of the type shown in FIG. 1, wherein in FIG. 3A, the thin cooling plate is made of sapphire, and in FIG. 3B, of diamond;

DETAILED DESCRIPTION OF PREFERRED EMBODIMENTS

Figure 1:
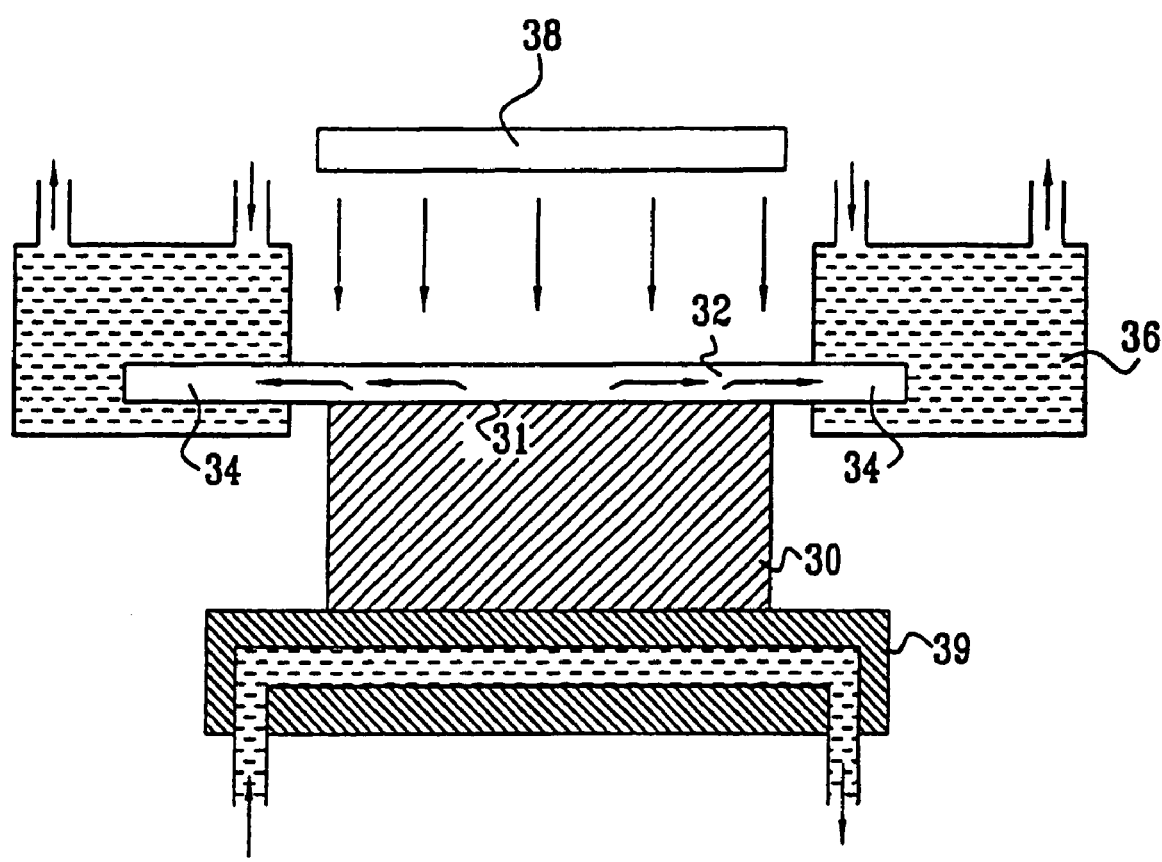
FIG. 1 is a schematic view of a side-pumped solid-state laser, constructed and operative according to a preferred embodiment of the present invention, with a thin plate of diamond attached in good thermal contact to one side of the lasing slab.

Reference is now made to FIG. 1, which is a schematic cross-sectional view of a side-pumped solid-state laser, constructed and operative according to a preferred embodiment of the present invention. To one side of the lasing slab 30 is applied, in good thermal contact, a thin plate of diamond 32. An area of the contact face of diamond 32 may be optically polished to provide good thermal contact without necessitating use of an intermediate compound. Alternatively or additionally, a thermal conductive material may be used as an intermediate compound, wherein such a material may have a refractive index that approximately matches a refractive index of diamond 32. For example, improved thermal contact can be provided by the use of a microscopically thin layer of contact fluid 31, preferably an index matching gel, between the slab and the diamond plate. The diamond plate is cooled at its extremities 34 by means of flowing water 36. Alternatively and preferably, the extremities of the diamond plate can be embedded in a copper block, operative as a heat sink, and water flowed through the copper block to keep it cool.

Diamond has exceptionally good thermal conduction properties, being about 5 times more conductive than the copper slabs previously used in prior art lasers for cooling the sides of the lasing slab, and about two orders of magnitude more conductive than sapphire. Table I shows the comparative thermal conductivities of diamond, sapphire and copper, in order to demonstrate one of the primary bases for the improvement in the operation of diode-pumped lasers, as engendered by the present invention. Other relevant properties shown in table 1 are the absorption coefficient at typical pumping wavelengths, and the index of refraction, as required for Fresnel reflection correction. The values for two preferred lasing media for use in the present invention, Nd:YAG and Nd:YVO$_4$ are also given.

TABLE I

| Material | Relative internal transmissivity at 808 nm | Index of refraction n | Thermal conductivity (W/m. deg K) |
|---|---|---|---|
| Diamond | High[1] | 2.38-2.42 (from 400 nm-10μ)[1] | 1900-2200 (at 300° K)[1] 1500-1600 (at 425° K)[1] |
| Sapphire | High[5] | 1.76 (at 820 nm)[5] | 20.2-18.7 (at 100° F.)[2] |
| Copper | Opaque | | 379-386 (at 173-273° K)[3] |
| Nd:YAG | Low | 1.82 (at 808 nm)[6] | 10.5-14 (at 293-373° K)[4] |
| Nd:YVO$_4$ | Low | n$_o$ = 1.97, n$_e$ = 2.19 (at 808 nm)[6] | 5.1-5.2 (at 300° K)[4] |

[1]De-Beers Ltd catalog on DIAFILM OP
[2]Handbook of Tables for Applied Engineering Science, by R. Bolz and G Tuve, Chemical Rubber Co., 1970
[3]J. P. Holman, Heat Transfer, 7$^{th}$ edition, McGraw-Hill
[4]Casix Inc., catalog
[5]Melles Griot Inc., catalog
[6]CVI Inc., catalog Unlike copper, however, the diamond plate is transparent, so that it now becomes possible to side-pump the lasing slab by means of diodes 38 positioned in the conventional way above the slab. The laser, according to this embodiment of the present invention, thus has the property that the direction of the pump light and the direction of cooling are co-axial, with the concomitant advantages of improved lasing symmetry and reduced tendency for thermal lensing and rod distortion, as mentioned above. The conductivity of the diamond plate is so high that a very thin plate suffices to efficiently transport the heat generated in the lasing slab. Plates of thickness 0.3 mm are preferably used, and can be obtained from De Beers Industrial Diamond Division, of Shannon, Co. Clare, Ireland. The surfaces may preferably be treated with a wavelength selective coating to reflect the lasing wavelength and transmit the pump wavelength, as is known in the art. This increases the pumping efficiency. Alternatively and preferably, a simple anti-reflection coating at either of these wavelengths may be used.

In the embodiment shown in FIG. 1, the bottom side of the slab is mounted in good thermal contact with a water cooled block of copper 39, but it is to be understood that it could equally be cooled by contact with a second diamond plate, cooled at its extremities, such that it could be pumped from the bottom face also.

Figure 2:
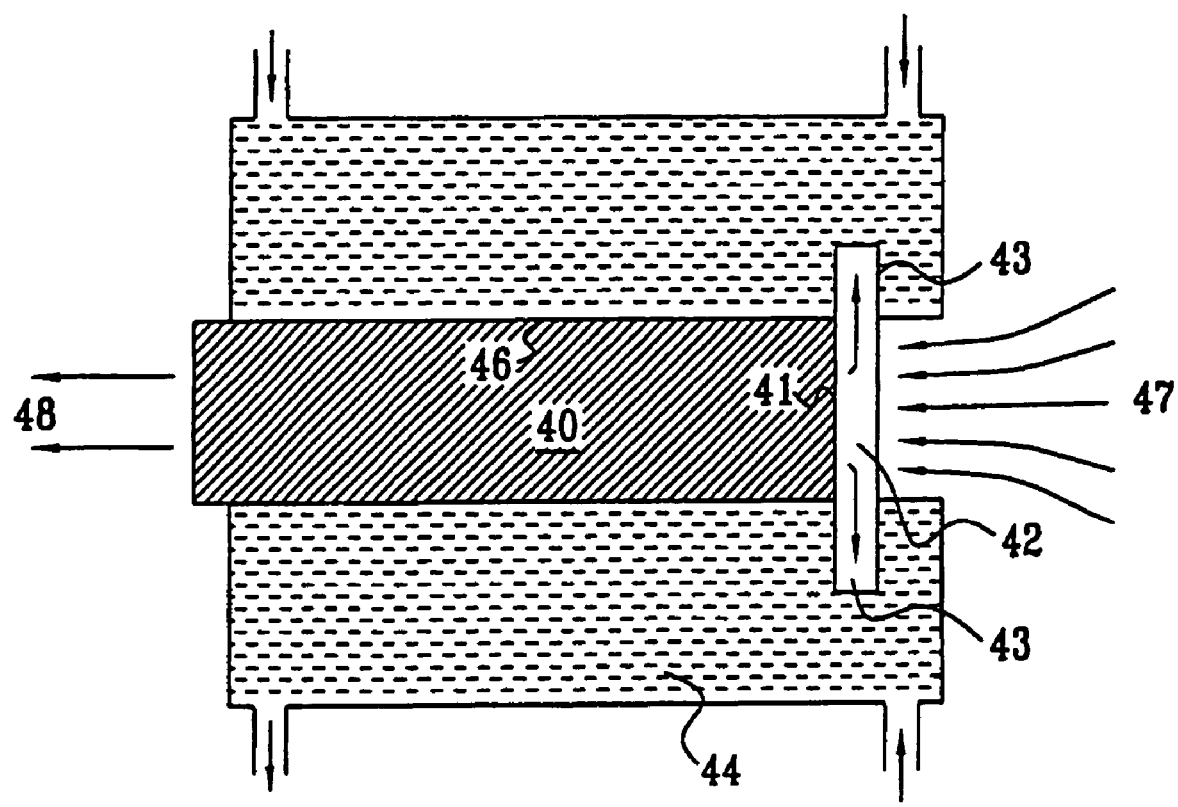
FIG. 2 is a schematic view of an end-pumped solid-state laser, constructed and operative according to a preferred embodiment of the present invention, with a thin plate of diamond attached in good thermal contact to an end face of the lasing slab.

Reference is now made to FIG. 2, which is a schematic side view of an end-pumped solid-state laser, constructed and operative according to another preferred embodiment of the present invention. The lasing rod 40 is cooled from its end face 41 by means of a diamond plate 42 cooled at its peripheries 43 by flowing water 44. The laser is end-pumped 45 through the diamond plate. The lasing rod or slab 40 is cooled by direct water contact along its length 46, and also by conduction of heat from its end face by means of the diamond plate outwards towards the water cooled peripheries 43, as shown by the arrows in the diamond plate. The pump light 47 is concentrated onto the end face 41 of the rod, through the diamond plate 42. The diamond plate is used to provide additional end face cooling exactly at the location where the pump power density is highest. The diamond plate thus acts both as a cooling element for the end plate, and as the transparent input window for the pump light. As the pump power gets absorbed in its path down the lasing rod, the absorption within the rod decreases, and the amount of heat that needs to be extracted is reduced. The lasing output beam 48, exits the lasing rod at the far end of the rod towards the output mirror (not shown).

The lasing medium shown in the embodiment of FIG. 2 is a rod, though it is to be understood that the same end-face cooling can be applied also to a slab. Furthermore, it is to be understood that, according to another preferred embodiment of the present invention, both side face diamond plate cooling, as depicted in FIG. 1, and end-face diamond plate cooling, as in FIG. 2, can be employed on a single laser.

Figure 3A:
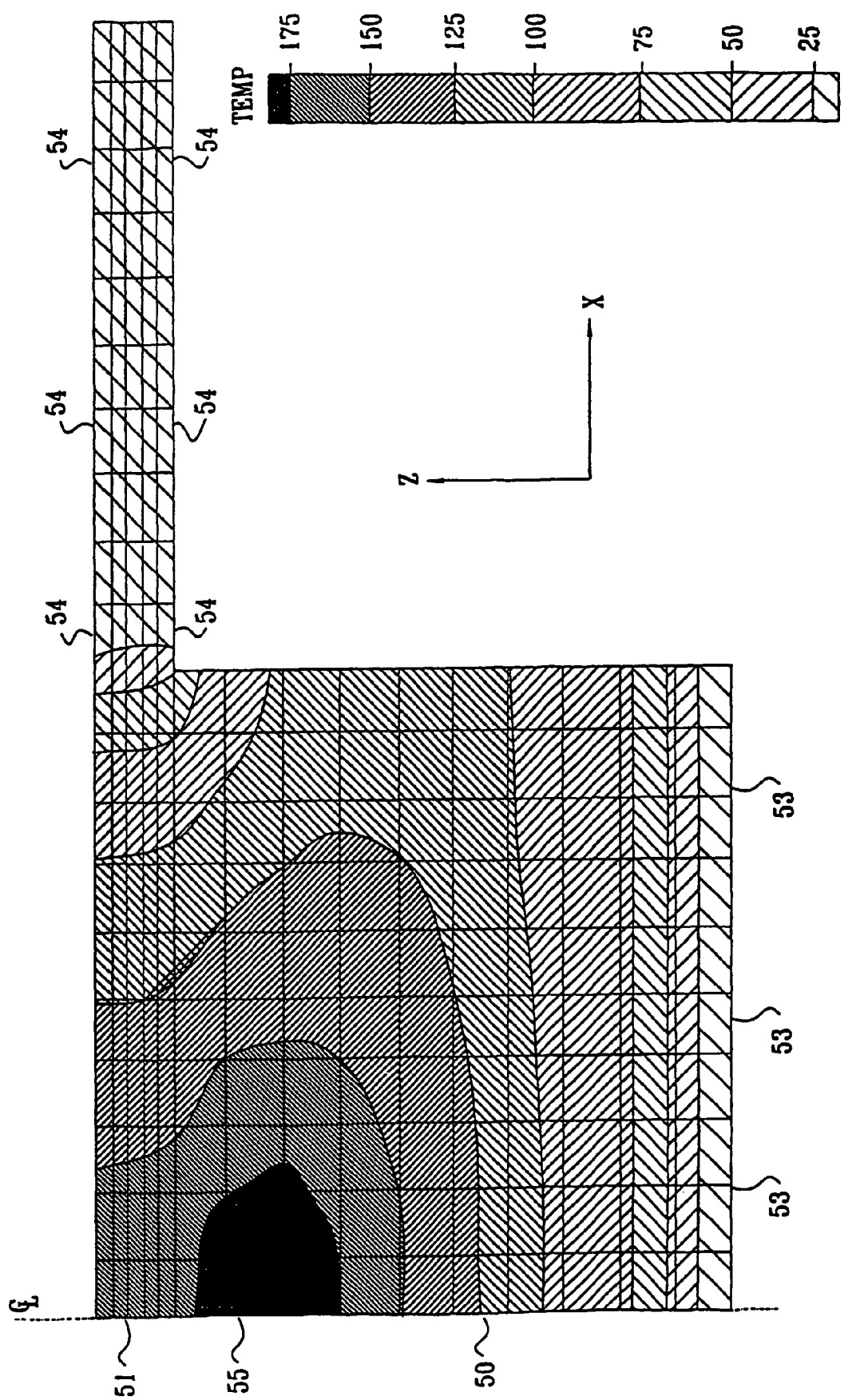

Reference is now made to FIGS. 3A and 3B, which are respectively, output plots from computer simulated calculations, showing the cooling abilities of a sapphire plate 51 and a diamond plate 52, used in a laser of the type depicted in FIG. 1. The figures show the temperature equipotentials formed across the cross-section of a $YVO_4$ lasing slab 50 and along the cooling plate for the two cases, with the same slab dissipation in both cases. The plates in the two cases are of the same dimensions, and are 0.3 mm in thickness. For the purposes of the simulation, the bottom surface 53 of the slab is maintained at a fixed low temperature, as if cooled by contact with a water-cooled copper block. The surfaces of the cooling plate beyond the position of contact with the slab, 54, are also maintained at a fixed low temperature, as if also cooled by contact with cooling water, or a water-cooled heat sink. Because of the symmetry in the X-direction, only the right hand half of the lasing head is shown in the two figures.

As is observed in FIG. 3A, where a 0.3 mm thick sapphire window plate 51 is used, because of the limited thermal conduction down the length of the sapphire plate, there are strong x-axis temperature gradients along the length of the cooling plate where it contacts the lasing slab and along the x-axis of the slab itself. As a result, the desired symmetry of temperature along the pumping and cooling directions is lost. As a consequence, there will be significant stress within the slab, and thermal lensing because of the temperature gradients along the x-direction. Furthermore, because of the limited thermal conduction down the sapphire plate, the temperature throughout the slab is higher, and at the center, rises to a significantly high level, 183° C. for the simulation example shown, thus significantly reducing lasing efficiency.

In contrast to the above results, reference is now made to FIG. 3B, where a 0.3 mm thick diamond window plate is used. It is observed that the cooling ability of the diamond plate is so good, that there is now no discernable temperature gradient, neither along the length of the diamond plate, nor along the x-direction within the lasing slab. The conduction of the diamond plate is so high that it appears as though the whole of the top surface of the slab is in good thermal contact with the heat sink. Under such conditions, the flow of pumping energy into the slab in the z-direction, and the flow of heat out into the diamond plate are co-directional and very uniform. This assumes, of course, that the input pumping energy flow is uniform across the slab, as desired in the ideal case. This elimination of temperature gradients along the x-direction of the slab effectively eliminates thermal lensing within the slab, thereby improving the beam quality and stability. Furthermore, the overall cooling ability of the diamond plate is so good that the maximum temperature reached in the center of the lasing slab is approximately 110° C., thus significantly improving laser efficiency and permissible power output.

Figure 4:
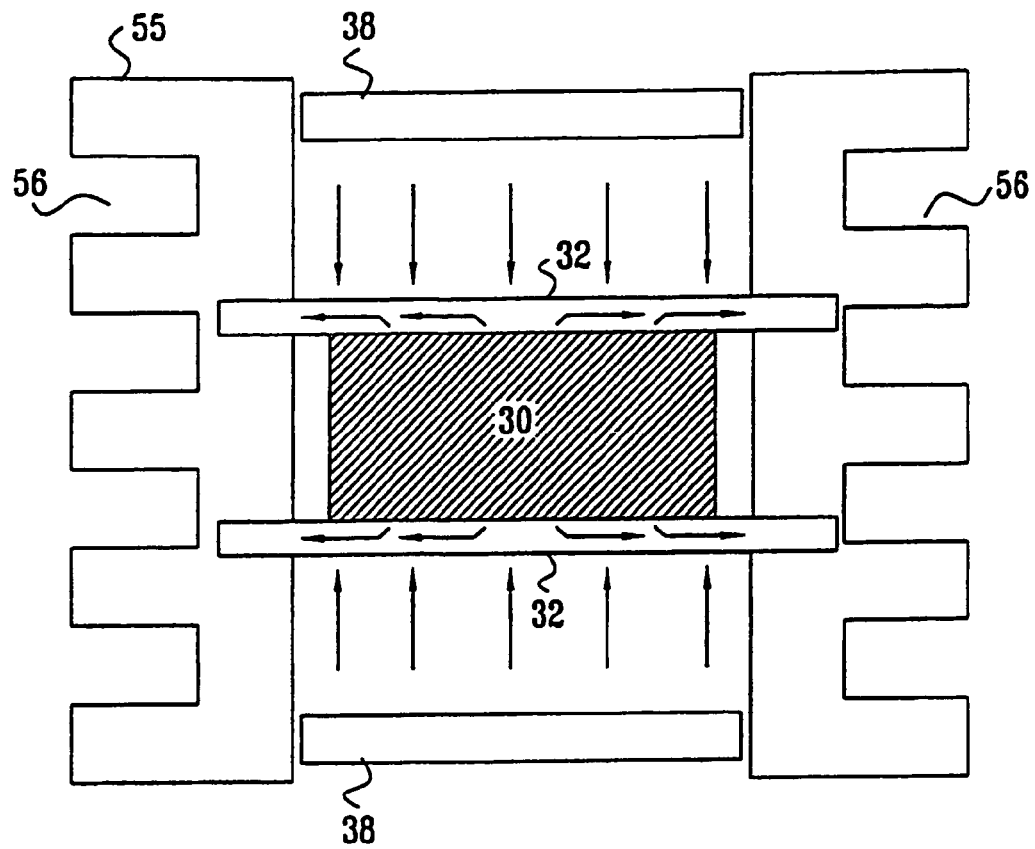
FIG. 4 is a schematic illustration of another preferred embodiment of the present invention, similar to that shown in FIG. 2, but wherein the diamond plate is cooled at its periphery by means of forced air.

Reference is now made to FIG. 4, which is a schematic illustration of another preferred embodiment of the present invention, with two differences from the embodiment shown in FIG. 1. Firstly, in the embodiment shown in FIG. 4, the lasing slab 30 is pumped from both sides, and has diode pumping arrays 38 and diamond plates 32 on both sides of the slab, thus increasing the potential power output of the lasing medium. Secondly, the diamond plates 32 are cooled at their periphery by means of forced air. The ends of the diamond plates are preferably in good thermal contact with aluminum heat sinks 55, as is known in the art, and the dissipated heat from the lasing medium is removed from the fins 56 of the heat sinks by means of forced air cooling. The air can be supplied either by built-in fans, or by an air-line supply, or by any other means. The laser of these embodiment has the advantage of not being dependent on connection to a water supply, and thus opens up new avenues for portable applications of the present invention.

Figure 5:
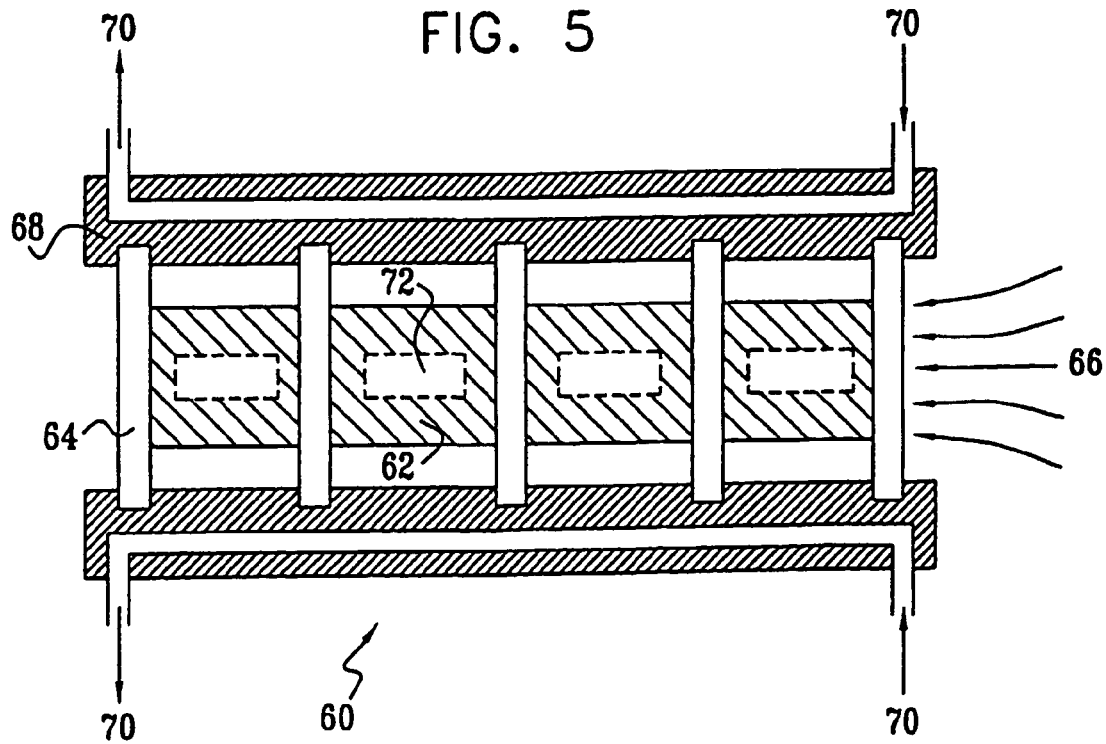
FIG. 5 is a schematic drawing of a composite laser rod, constructed and operative according to another preferred embodiment of the present invention, with thin diamond plates inserted between neighboring lasing segments in the rod, to remove the heat therefrom.

Reference is now made to FIG. 5, which is a schematic side-view drawing of a multiple segment lasing head 60, constructed and operative according to another preferred embodiment of the present invention. The head is constructed of lasing segments 62 stacked end to end, with thin diamond plates 64, cooled at their peripheries, inserted between neighboring segments. The diamond plates 64 provide an efficient cooling path from the entire cross section of each of the segments. The peripheries of the diamond plates are preferably cooled by contact with blocks of copper 68, cooled by means of a flow of water 70. The head is preferably end-pumped by means of diode-emitted light 66 concentrated on an end face of the stack, or on the first diamond plate, and transmitted through the total length of the complete segment/plate/segment/plate . . . lasing stack. By this means, a compact multiple segment laser rod can be produced, which, because of the efficient cooling means effectively dispersed through the center of the rod down its length, is capable of a higher combined output power than would be attainable by the use of a single laser rod of similar dimensions.

In the preferred embodiment shown in FIG. 5, the lengths of the lasing segments are varied, tapering from being shorter at the pump end to longer at the output end of the lasing rod. This is done in order to provide diamond plate cooling at closer intervals in the region where the heat dissipation is highest, i.e. near the pumping input. It is to be understood, though, that segments of any preferred length may equally be used in the invention. The difference in refractive indices of the diamond plates and the lasing medium needs to be taken into account when calculating the mode of the laser cavity, but the high transparency of the diamond plates, and their intimate contact with the lasing segments, ensure that the presence of the cooling plates does not interfere with the quality of the mode. Selective anti-reflection coatings can preferably be applied to the diamond plates in order to reduce Fresnel reflections, either of the pump light, or of the lasing light.

Alternatively and preferably, the laser head shown in FIG. 5 may be side pumped by means of diode arrays 72 located opposite the faces of the segments, or the if they are cylindrical, opposite the outer surfaces of the segments. According to yet another preferred embodiment, the laser head shown in the embodiment of FIG. 5, may be side-pumped and end-pumped.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed is:

1. Apparatus comprising:
    a diode-pumped, solid state laser comprising a lasing medium comprising at least one surface through which said laser is pumped; and
    at least one diamond plate in thermal contact with said at least one surface, wherein a plurality of segments of said lasing medium are disposed in proximity to each other, and said at least one diamond plate is disposed between two adjacent segments, and in thermal contact with said segments, wherein said laser is end-pumped through said plurality of segments and through said at least one diamond plate, and wherein the thicknesses of said segments through which said end pumping is performed increase essentially according to the depth through which said pumping passes.

2. Apparatus according to claim 1 wherein said at least one diamond plate is cooled remotely from the area of said thermal contact with said at least one surface.

3. Apparatus according to claim 2, wherein said at least one diamond plate is cooled by means of at least one of convection and conduction.

4. Apparatus according to claim 1 further comprising at least a second diamond plate in thermal contact with a second surface of said lasing medium.

5. Apparatus according to claim 1 wherein said laser is end-pumped.

6. Apparatus according to claim 5, further comprising a second diamond plate in thermal contact with a surface of said lasing material distant from that through which said laser is pumped.

7. Apparatus according to claim 6, wherein the lasing beam is output through said second diamond plate.

8. Apparatus according to claim 1 wherein said laser is side-pumped.

9. Apparatus according to claim 1 wherein an area of said at least one diamond plate that is in thermal contact with said at least one surface is optically polished.

10. Apparatus according to claim 1 further comprising a layer of a thermal conductive material between said at least one surface and said at least one diamond plate.

11. Apparatus according to claim 10, wherein said thermal conductive material has a refractive index that approximately matches a refractive index of said at least one diamond plate.

12. Apparatus according to claim 1, wherein the location of said diamond plate is such that the direction in which said laser is pumped and the direction in which said laser is cooled are essentially co-linear.

13. Apparatus according to claim 1, wherein said laser is side-pumped through at least one of said segments and essentially parallel to the plane of said at least one diamond plate.

14. Apparatus according to claim 1, wherein said lasing medium is Nd:YAG.

15. Apparatus according to claim 1, wherein said lasing medium is Nd:YVO$_4$.

16. Apparatus according to claim 1, wherein said at least one diamond plate is anti-reflecting at the wavelength at which said laser is pumped.

* * * * *